United States Patent
Schneider

(10) Patent No.: US 11,618,033 B2
(45) Date of Patent: Apr. 4, 2023

(54) CEREAL MILL AND ROLL STAND WITH SEVERAL MILLING PASSAGES FOR OPTIMISED MILLING OF MILLING MATERIAL AND CORRESPONDING PROCESS

(71) Applicant: Bühler AG, Uzwil (CH)

(72) Inventor: Michael Schneider, Uzwil (CH)

(73) Assignee: BÜHLER AG, Uzwil (CH)

( * ) Notice: Subject to any disclaimer, the term of this patent is extended or adjusted under 35 U.S.C. 154(b) by 255 days.

(21) Appl. No.: 17/058,667

(22) PCT Filed: Apr. 10, 2019

(86) PCT No.: PCT/EP2019/059131
§ 371 (c)(1),
(2) Date: Nov. 25, 2020

(87) PCT Pub. No.: WO2019/223930
PCT Pub. Date: Nov. 28, 2019

(65) Prior Publication Data
US 2021/0252520 A1  Aug. 19, 2021

(30) Foreign Application Priority Data

May 25, 2018 (EP) .................................... 18174239
May 28, 2018 (CH) .................................... 00678/18

(51) Int. Cl.
*B02C 25/00* (2006.01)
*B02C 4/06* (2006.01)
*B02C 9/04* (2006.01)

(52) U.S. Cl.
CPC .................. *B02C 4/06* (2013.01); *B02C 9/04* (2013.01); *B02C 25/00* (2013.01)

(58) Field of Classification Search
CPC .... B02C 4/06; B02C 9/00; B02C 9/04; B02C 25/00
See application file for complete search history.

(56) References Cited

U.S. PATENT DOCUMENTS 4,363,448 A * 12/1982 Machler .................. B02C 25/00
  241/13
8,720,804 B1 * 5/2014 Pearson .................... B02C 9/04
  241/34

FOREIGN PATENT DOCUMENTS

CN      108940552 A  * 12/2018  ............. B02C 23/02
DE   102008040095 A1   1/2010
(Continued)

OTHER PUBLICATIONS

Nixplay Seed 10 Inch Wifi Cloud Digital Photo Frame with IPS Display, iPhone & Android App, Free 10GB Online Storage and Motion Sensor (Black), Jul. 24, 2015, Retrieved from Amazon.com Dec. 8, 2022, 10 Pages. (Year: 2015).*

(Continued)

*Primary Examiner* — Faye Francis
(74) *Attorney, Agent, or Firm* — Xsensus LLP

(57) ABSTRACT

A milling installation and a corresponding method for the milling and/or crushing of granular fruits or the like provide optimized closed-loop and open-loop control. A central closed-loop and open-loop control apparatus provides the optimized control of the milling installation. Memory-programmable controllers are connected bidirectionally via network interfaces to the central closed-loop and open-loop control apparatus and/or addressed and controlled by transmitted control parameters. The control apparatus controls centrally, in particular in a web-based manner, the processing apparatuses of different passages of the same or different mills. During the generation of the control parameters, a (Continued)

distinction is drawn between passage-specific and environment-specific management/operating parameters.

16 Claims, 5 Drawing Sheets

(56) References Cited

FOREIGN PATENT DOCUMENTS

| EP | 0013023 A1 | 7/1980 | |
|---|---|---|---|
| WO | WO-9741956 A1 * | 11/1997 | ............... B02C 4/32 |
| WO | WO-2010000816 A1 * | 1/2010 | ............. B02C 25/00 |
| WO | WO-2013135308 A1 * | 9/2013 | ............. B02C 25/00 |
| WO | 2014/187799 A1 | 11/2014 | |
| WO | WO-2016155857 A1 * | 10/2016 | ............. F01K 13/02 |

OTHER PUBLICATIONS

Machine translation of WO 2010/000816, Retrieved from Espacenet Oct. 7, 2022, 5 Pages. (Year: 2010).*
Machine translation of CN 108940552, Retrieved from Search Oct. 8, 2022, 7 Pages. (Year: 2018).*
Machine translation of WO 2013/135308, Retrieved from Search Oct. 8, 2022, 19 Pages. (Year: 2013).*
International Search Report and Written Opinion dated Jul. 9, 2019, received for PCT Application No. PCT/EP2019/059131 filed on Apr. 10, 2019, 12 Pages including English Translation.
International Preliminary Report on Patentability (Chapter II) dated Nov. 26, 2020, in corresponding PCT Application No. PCT/EP2019/059131, 7 Pages.

* cited by examiner

| 73 | P0010 | SetPresure | 4 | 1 | 6 | Base | Par-General |
|---|---|---|---|---|---|---|---|
| 74 | P0011 | SensCleanDur | 2 | 0 | 30 | CIP_enabled | Par-General |
| 75 | P0012 | SensCleanPause | 1 | 0 | 360 | CIP_enabled | Par-General |
| 76 | P0013 | GridCleanDur | 3 | 0 | 30 | CIP_enabled | Par-General |
| 77 | P0014 | GridCleanPause | 2 | 0 | 360 | CIP_enabled | Par-General |
| 78 | P0030 | AutoEngageUpper1 | 1 | 0 | 1 | Base | Par-Grinding-1 |
| 79 | P0030 | AutoEngageUpper2 | 1 | 0 | 1 | Base | Par-Grinding-2 |
| 80 | P0031 | AutoEngageLower1 | 1 | 0 | 1 | 8_Roller_Mill1 | Par-Grinding-1 |
| 81 | P0031 | AutoEngageLower2 | 1 | 0 | 1 | 8_Roller_Mill2 | Par-Grinding-2 |
| 82 | P0032 | EngageDelay1 | 2 | 0 | 10 | Base | Par-Grinding-1 |
| 83 | P0032 | EngageDelay2 | 2 | 0 | 10 | Base | Par-Grinding-2 |
| 84 | P0033 | DisEngageDelay1 | 2 | 0 | 10 | Base | Par-Grinding-1 |
| 85 | P0033 | DisEngageDelay2 | 2 | 0 | 10 | Base | Par-Grinding-2 |
| 86 | P0034 | GearTempWarn1 | 65 | 30 | 90 | geartemp_enabled1 | Par-Grinding-1 |
| 87 | P0034 | GearTempWarn2 | 65 | 30 | 90 | geartemp_enabled2 | Par-Grinding-2 |
| 88 | P0035 | GearTempAla1 | 70 | 30 | 90 | geartemp_enabled1 | Par-Grinding-1 |
| 89 | P0035 | GearTempAla2 | 70 | 30 | 90 | geartemp_enabled2 | Par-Grinding-2 |
| 90 | P0036 | BearTempWarn1 | 65 | 50 | 95 | beartemp_enabled1 | Par-Grinding-1 |
| 91 | P0036 | BearTempWarn2 | 65 | 50 | 95 | beartemp_enabled2 | Par-Grinding-2 |
| 92 | P0037 | BearTempAla1 | 75 | 55 | 95 | beartemp_enabled1 | Par-Grinding-1 |
| 93 | P0037 | TargetGapUpperLeft1 | 75 | 55 | 95 | beartemp_enabled2 | Par-Grinding-2 |
| 94 | P0038 | BearTempAla2 | 6 | 1 | 11 | Base | Par-Grinding-1 |
| 95 | P0038 | TargetGapUpperLeft2 | 6 | 1 | 11 | Base | Par-Grinding-2 |
| 96 | P0039 | TargetGapUpperRight1 | 6 | 1 | 11 | Base | Par-Grinding-1 |
| 97 | P0039 | TargetGapUpperRight2 | 6 | 1 | 11 | Base | Par-Grinding-2 |
| 98 | P0040 | TargetGapLowerLeft1 | 6 | 1 | 11 | 8_Roller_Mill1 | Par-Grinding-1 |
| 99 | P0040 | TargetGapLowerLeft2 | 6 | 1 | 11 | 8_Roller_Mill2 | Par-Grinding-2 |
| 100 | P0041 | TargetGapLowerRight1 | 6 | 1 | 11 | 8_Roller_Mill1 | Par-Grinding-1 |
| 101 | P0041 | TargetGapLowerRight2 | 6 | 1 | 11 | 8_Roller_Mill2 | Par-Grinding-2 |
| 102 | P0042 | ForceFilter1 | 3 | 1 | 30 | Base | Par-Grinding-1 |
| 103 | P0042 | ForceFilter2 | 3 | 1 | 30 | Base | Par-Grinding-2 |
| 104 | P0020 | FeedingGapPos1 | 0 | 0 | 1 | Base | Par-Feeding-1 |
| 105 | P0020 | FeedingGapPos2 | 0 | 0 | 1 | Base | Par-Feeding-2 |

Fig. 4

CEREAL MILL AND ROLL STAND WITH SEVERAL MILLING PASSAGES FOR OPTIMISED MILLING OF MILLING MATERIAL AND CORRESPONDING PROCESS

CROSS-REFERENCE TO RELATED APPLICATION

The present application is based on PCT filing PCT/EP2019/059131, filed Apr. 10, 2019, which claims priority to CH 00678/18, filed May 28, 2018, which claims priority to EP 18174239.6, filed May 25, 2018, the entire contents of each are incorporated herein by reference.

FIELD OF THE INVENTION

The present invention relates to mechanical process and device technology for processing and reducing of an initial product with specific initial product parameters into an endeavoured end product with defined end product properties/dispersity properties, the invention particularly relates to mill regulation and/or control technology of batch-oriented processes of the food industry, concentrated feed industry or similar technical areas of application of milling or grinding technology such as, for example, the reduction of stones or other coarse materials. The particular focus of the invention is on the control and monitoring of grinding/milling installations such as cereal mills with roll stands with several milling passages for milling or reducing of milling materials, i.e. regulation and control devices for automated regulation and control of process devices of mechanical processing installations of disperse products, such as milling and rolling systems, particularly cereal milling installations with one or more roll stands. The invention further relates to the technical optimisation of control devices for cereal mills and other installations for processing and reducing of cereals, particularly installations for reducing, transporting, fractioning and packaging, and optimised regulation and control processes and regulation devices for the optimised control and monitoring of such installations. Possible applications of the device according to the invention also relate to milling and rolling systems with real-time or quasi-real-time measurement, real-time monitoring and real-time regulation/control of operating parameters, such as rolling temperature, roll gap, roll speed, roll compression force and/or energy consumption of one or various roll drives, and/or with real-time or quasi-real-time measurements of ingredients or quality parameters during the product preparation and—processing in the cereal mill installations for the purpose of process monitoring (measurement, monitoring), and control and/or regulation of the installations and/or processes such as, for example, measurement quantities such as water content, protein content, starch damage, ash content (mineral materials) of flours (or milling intermediate products), residual starch content, milling fineness etc. However, the invention may, as mentioned, as quite generally be used in milling systems, for example, ball mills or what are known as semi-autogenously grinding (SAG) mills intended for grinding coarse-grained materials such as ores or cement etc., for example. Also with such mills, the throughput and product quality parameters are controlled by means of adjusting various control variables or guidance variables such as, for example, rotational speed of the milling drum, energy consumption of the milling drum, infeed of the (coarse-) grained initial/input materials, water infeed when milling ore and/or discharge speed of the milled material present at the output. Also in these mills, the grain size distribution of the material to be milled is an important quality characteristic. Particularly it can affect the yield of the further components downstream of the milling system such as, for example, flotation. Typically in milling installations and milling systems, as high as possible throughput and yield with high product quality and low energy consumption and material requirement, i.e. costs, is endeavoured.

The present invention therefore relates, in the preferred application to rolling systems, product processing installations and milling installations containing rolls or roll pairs, and the corresponding process for optimised operation of such milling and rolling systems and/or product processing installations. The installations mentioned include complete installations for (i) cereal milling, (ii) flour preparation for industrial bakeries, (iii) installations for special milling, (iv) production installations for the manufacture of high-quality feed for livestock and pets, (v) special installations for the manufacture of feed for fish and crustaceans, (vi) premix and concentrate installations for the manufacture of mixtures of active ingredients, (vii) oil production from oil seeds, (viii) treatment of extraction waste and white flakes, (ix) high power installations for processing of biomasses and the manufacture of energy pellets, (x) installations for ethanol manufacture, (xi) complete rice processing installations, (xii) sorting installations for food, seeds and plastics, (xiii) cereal and soya handling, (xiv) industrial malting and malt handling installations, (xv) machines and installations for processing cocoa beans, nuts and coffee beans, (xvi) machines and installations for manufacturing chocolate and fillers and coatings (xvii) systems and installations for extruding (cooking and forming) breakfast cereals, food and feed ingredients, pet food, aquafeed and pharmaceutical products, (xviii) planning of total solutions for wet milling technology and manufacturing of machines and process equipment for the manufacture of printing inks, coatings and particle dispersions for the cosmetics, electronics and chemical industry, (xix) isolation and characterisation of aleurone from wheat bran, rice fortification etc.

BACKGROUND TO THE INVENTION

Many processes of mechanical process technology are directed at altering particle properties, such as particle size, e.g., by reduction, or to another change of the state of the mixture, e.g., by screening or sifting the initial material. The characterisation of the disperse properties of the end product, i.e. the particle measurement technology and the selected configuration by selection of suitable measurement parameters is normally used to prove the success of the measures of the relevant process. In this, frequently, the success of a process itself is determined decisively by the disperse condition of the initial product/material to be processed. Thus, typically in mechanical milling processes the materials are more difficult to reduce and more difficult to separate as the particle size decreases. The processes of mechanical process technology interesting in this case can be classified, whether they are associated with a change of the dispersity condition such as, for example, reducing inside a milling passage of a mill, or a change of composition such as, e.g., screening out inside a sifting or screening passage of a mill. The initial material and the end product can be characterised by various properties such as, e.g., size, shape, rigidity, structure, colour, porosity, homogeneity etc. The characteristics may, be arranged differently within the process material, e.g., as primary particle, agglomerate of ordered structures etc. The characteristics and their arrangement/mixing condition may be decisive for the product properties. The significance of mechanical processes and corresponding devices in the material-changing industry is enormous and comprises chemistry, nutritional and feed production as well as the manufacture of building materials. The present invention essentially relates to milling installations, such as are used in cereal mills, for example. However, fundamentally it is in no way restricted to these applications but may generally be used in the control, inspection and monitoring of processing systems and installations of mechanical process technology comprising several processing lines.

Assessing the effect of the mechanical processing device, such as, e.g., the milling installation or cereal mill, and controlling/regulating the operating or process parameters in the processing device accordingly are decisive for the manufacture, characterisation and/or assessment/monitoring of disperse products. To do this, it is necessary to record and configure (characterise) the properties, particularly the physical, chemical or even disperse properties of the initial or any intermediate and end product. For example, it is important for the selection and control of a separation process, such as a screening process, to determine size and shape distribution and their proportions. In the typical application of mechanical processing devices, certain product properties and characteristics of the end product are expected. One of the aims is to obtain the properties, particularly the dispersion properties of the end product, in a targeted and reproducible way, by suitable selection of the operating or process parameters in the processing device, depending on the initial product. In so doing, the dispersion properties of the process material have a direct effect on the endeavoured product properties, for example, particle size of the flour on the properties of the flour in further processing. The selection of the operating or process parameters in a process device is therefore based both on the determination or measurement of product properties, particularly of dispersion properties. Frequently required product properties result from a determination of certain operating and/or process parameters, on the basis of empirical optimisation and adaptation relating to processing, application and/or product, frequently determined by an operator or human expert. If it is known with which initial product characteristics, particularly which dispersity sizes of the initial products the desired product properties can be obtained, it is to be determined which operating or processing parameters of the processing/process device are to be set to this in the relevant process stage and/or in the overall process. It is mostly characteristic for these processes that the condition and behaviour of a product, particularly during the processing process, is not known or even only known and predictable imprecisely beforehand. Although the particle and product property measurement technology is very advanced today compared with before, in most systems, a complete description is not possible. The effects of machines, apparatus and process/operating parameters on the end product properties, such as their dispersity properties, must be determined in all or most cases for each initial product and desired end product experimentally and/or based on the experience and intuition of the operator. To keep an overview of the plurality of parameters, a structured process plays a dominant role in this. In many cases of mechanical process technology, the dispersity properties form the link between initial materials, intermediate products and the endeavoured product properties. After selecting the suitable processing installation, it is fundamentally to be determined for all measurement and control concepts which operating and processing parameters exhibit a particularly direct dependence on the obtained properties of the end product, depending on the measurement properties of the initial material. A reproducible production and scalability in processing by a certain installation is otherwise not possible with such complex processes.

The requirements may, for example, be shown for a milling installation for reducing milling material. After selecting a suitable milling installation, depending on the milling material, the process behaviour must be determined as neither the reduction behaviour of the milling material is unambiguously characterisable, nor the effects of the operating and process parameters of the milling installation on the end product and/or particle properties is unambiguously predictable. To be balanced for the operator is, for example, how sensible throughput, speed/specific energy or geometric parameters of the mill or milling installation such as, e.g., gap width between milling rolls, affect the properties of the end product, particularly the dispersity properties of the product. The most important control parameters, i.e. dispersity size, in the reduction of milling material, is the endeavoured particle size or even distribution of particle sizes. Because of the complex interconnections, today as well the effect, e.g., of the rotation speed of the rolls, the throughput, the product guidance in the passages, the milling body thickness and the milling body size on the resulting distribution of particle sizes are typically determined experimentally, i.e. based on the "trial-and-error" process and empirical values. It is also true that with corresponding regulation and control technologies, due to the complexity of the interactions between milling material properties and measurements, the operation and process parameters and the endeavoured end product properties, to date, mostly only the particle size can be considered as a physical quantity.

At the forefront of the present invention are milling and grinding installations for reducing milling material. The term milling installation, as used in the following, comprises all technological devices and processes for the production of grainy and/or powdery (flour-like) or only husked or squashed end products from coarse, solid (and in cereal mills, plant) milling materials, which are used for processing the milling material, particularly cereal mills. Milling material in the sense of this application particularly comprises all types of grain and cereals which are milled into a milling product or even milling end product such as flour, semolina, coarse-grained flour and grist. Such milling installations are in use, for example, also in the context of hulling milling for husking, hulling, with any subsequent squashing of the milling material, such as, e.g., cereal grains. The grain and cereal types and varieties comprise, e.g. wheat, rye, spelt, maize etc., which are processed into various types of milling products such as flour, according to the principle of high grinding. In this case, the cereal is normally cleaned and rinsed with water before it is milled, so that the water can penetrate into the husk (bran), that can be better separated from the flour body. The cereal is then milled with roll stands and corresponding milling passages. Then, at the mill passages, the milling material is screened, as appropriate, in screen passages on a sifter/oscillating sifter. Here, the flour is screened away and the grist is further milled again in milling passages, until, as much as possible, the entire flour body is broken away. This product guidance (milling and any sifting) is called passage. A milling line of a milling/grinding installation may comprise several passages, wherein the milling material is processed in the milling line into the milling product/milling end product.

In the prior art, cereal is milled in roll stands with mostly four or eight metal rolls that rotate in different directions at various speeds (advancement). Smooth and fluted rolls with twist are differentiated. By fluting and the various speeds, the cereal grains are broken down. In each milling process, different sizes of grain parts are produced. By multiple screenings in sifters (also: oscillating sifters), the grain parts can be sorted and separated according to size. The thus-occurring, predefined milling product is screened out and the remaining grist is introduced back onto a roll stand, wherein, once again, milling product is separated off, until all the milling product can be broken away. The milling product to be obtained may, e.g., be predefined as flour (grain size <180 µm), coarse-grained flour (grain size 180-300 µm), semolina (grain size 300-1000), grist (grain size >1000 µm), whole meal flour (approximately 80% fallen through 180 µm; contains all the components of the cleaned cereal grain). In the installations of the prior art, cereal and such products for milling run through typically 10-16 passages. The term passage, also strand, or run-through is defined in cereal milling as guiding the product into a mill. This product guidance consisting of the milling described and then sifting, is called passage. Generally, passage is differentiated by type, the grist passages, oscillating sifter passages, bran finisher, semolina cleaning machine, breaking up and comminution. In the grist passages (e.g. passages B1 to B5), the grist is continuously reduced on fluted rolls. In the breaking up passages (e.g. passages C1, C2, C4) the flour or even semolina platelets are processed on fine fluted and smooth rolls. In the milling passages (e.g. passages C3 and C5 to C11), semolina and coarse-grained flours are reduced to flours of the suitable type. Semolinas and coarse-grained flours always contain bran parts that are stuck on, which have to be handled separately, e.g. on separate passages C1B and C2B.

Milling installations comprise batch-oriented processes in which high benchmarks of repeatability and failure safety, as in the food industry, concentrated feed or even chemical industry, are necessary. The control of these processes requires complex control concepts and intelligent, adaptive control devices. Furthermore, it is true that, unlike in other areas of industry, in which the effect of various factors and process parameters are mostly well known, the dynamics of determining a process, and in which the relevant processes can therefore be configured simply by corresponding equations and formulae, or even the apparatus and device involved, can be simply activated and controlled accordingly, the number of relevant factors affecting milling quality and in the same way the yield of processed end product in milling is extraordinarily high. Therefore, it is often necessary for a miller, i.e. a human expert, after analysing the initial/raw material to have to adjust and set the entire milling or grinding installation manually based on their intuition and know-how, to obtain the desired results in the sense of the anticipated quality and yield of the end product (e.g. ash content, yield, baking quality etc.). This optimisation must also consider a minimisation of costs, i.e. particularly energy efficiency. Also to be considered is that the milling properties of the initial material, e.g. the rolled wheat or cereal are fundamental to the milling process. As the milling installation typically has to be controlled by the senior miller, the senior miller also has a decisive effect on and control in setting the properties of the flour produced. That starts with the selection of the wheat grade, which may also relate to the production location or region of the wheat, to affect certain grain attributes, such as, for example, a certain protein range. The miller also controls the wheat blend/grists, which is given in the milling installation. The miller can also determine the mill flow, roll speed, speed differentials, distribution of the fluted rolls, e.g. sharp-to-sharp and roll pressure for smooth rolls. The miller has other regulation options in combination with screening and cleaning, and finally in the mill flow selection for blending the produced end flour. All these parameters and regulation options are used by the miller consistently to produce a flour with a certain quality.

As the example discussed shows, particularly, for example, the milling rolls, as used in cereal mills, among others, need to be monitored constantly and, as appropriate, the operating and control parameters need to be adjusted or even corrected. Apart from optimising the operation and setting the characteristics of the end product, for example, it may be that what is known as a dry run, escalating into the regulation control or other operational anomalies occur. If an abnormal condition persists for too long then, for example, the temperature of the milling rolls may increase into a critical range and possibly cause a fire, or damage to the rolls. Operational anomalies may also affect the optimal operation of the installation in different ways, particularly the quality, yield or energy consumption. Although milling installations are at least partially automated in many areas, current systems relating to automated control and optimised operation are only automated with difficulty. In the prior art, milling systems are therefore often still set manually by operating staff according to their empirical values.

In the regulation and monitoring of milling installations, it is noted that each passage is monitored separately and, as appropriate, its operation must be adapted or even optimised. In so doing, the control can be done locally at the milling installation, which limits the monitoring options relating to the number of mills controlled by an individual operator or even miller. Also the prior art installations are problematic for other efficiency reasons, as each passage is assessed by the operator completely independently from the operation of other passages. Also this type of control is multiplied so as to cause errors, as valuable information available relating to the operation of parallel-running and/or similarly localised installations is not considered.

As far as the automation of the control or regulation of the operation of the prior art systems is concerned, for the reasons mentioned above, these are mostly restricted to signal transmission and transmission of control commands, e.g. by means of PLC control and connected input devices with a graphical user interface (GUI). PLC here designates a Programmable Logic Controller, which can be used as a device for controlling or regulating a machine or installation and can be programmed on a digital basis. If the quality of the input material changes, typically a certain time passes until a high throughput with good product quality can be achieved again. Furthermore, the operator also often only has available an indirect quality control that, for example, is produced using a yield feedback into one of the downstream components. This also makes is more difficult to make a good setting of the milling system or somewhat timely intervention when anomalies in the milling process occur. However, if the regulation and control of a milling roll system consists of one operator (senior miller), a complete mastery of the entire production flow is absolutely required, to be able to undertake such control "by hand". The result of the control is therefore essentially dependent on the relevant expert knowledge and experience of the operator, i.e. the supervisory senior miller. If less-qualified personnel are employed for the operation, e.g. during special periods (holidays, working at night etc.) then, depending on the circumstances, an impairment of the result may occur for setting the mill, such as due to a lower yield from bright flours or similar. Trials to replace the senior miller with processor-supported control devices showed that the complex knowledge and experience of the senior miller cannot be automated simply by regulation-controlled devices, particularly not by independent, autonomously-functioning regulating devices that get along without regular routine human interventions.

As far milling and reduction systems are concerned, various milling and reduction systems are known in the prior art. For cereals and cereal mills, the roll stand is by far the most important milling device. Whether maize, common wheat, durum wheat, rye, barley or malt are to be processed, the roll stand mostly provides the most ideal processing of all cereal varieties. The process used in a cereal mill is a stepped reduction. The endosperm is reduced in steps, by passing it through several fluted or smooth steel roll pairs. It is separated in sifters through the screen from the bran and the germling. In roll pairs of a roll stand, typically one roll rotates faster than the others. By the counter-rotation of both rolls, the material is draw into the roll gap. Shape, depth and twist of the fluting, together with the speed differential determine the intensity of milling in each step. Also known are impact mills. Impact mills are suitable, for example, for milling the most varied of products in cereal mills (cereals and by-products of milling), feed works (feed, pulses), breweries (manufacture of fine grist for mash filtration), oil milling (extraction grists and grist oil cake) or even pasta factories (pasta wastes). The product is directed to the impact mill or hammer mill from a preliminary container and carried away by the beater rotor. The particles are reduced until they can pass through the openings of a screen sleeve surrounding the rotor. Finally, flaking installations are known, in which the flaking rolling mill forms the core together with the corresponding steaming apparatus. In the upstream steaming apparatus, the flaking material is treated hydrothermically, before it gets into the flaking rolling mill. The installation is suitable for processing groats (entire, cleaned and shelled oat grains) and grout (cut oat grains), maize, soft wheat, barley, buckwheat and rice. It is to be noted that, due to the specific problems and requirements in the manufacture of flour and semolina from cereals and similar products, an independent type of rolling mill, what is known as the milling roll stand has been developed that, somewhat unlike the milling technology for rocks, include a quite unique milling technology for the manufacture of flakes from plant raw materials etc.

Even the distribution and dosing of milling material in the roll stand requires, in the prior art devices, typically the interaction of an operator (senior miller). In roll stands from the prior art, the milling material is normally introduced into the centre in the inlet of the relevant milling passage and backed up. The milling material is then conveyed by gravitation, in any case using a paddle roll, distributed outwards and through a feed roll into the roll gap. At the start of the milling process, the filling height of the inlet is first specified manually, e.g. by an operator, as the target level. In so doing, it is to be considered that, on the one hand, sufficiently free buffer volume is available (deep as possible level), but on the other hand, the milling material gets to the ends of the discharge unit (high as possible level). With a measuring device (for example, load cell), when operating, a deviation of the actual level from the target level is detected. A regulating device ensures that the discharge is adjusted so that the actual level corresponds as much as possible to the target level. Load cells have the disadvantage that the fill level of the milling material is measured not directly but indirectly and therefore a calibration has to be done, which depends greatly on the properties of the milling material. This is also the case in all other measurement principles in the prior art (for example, capacitive sensors), even if less pronounced. In the prior art, in the simplest case, the milling product only flows in the direction of the ends of the discharge unit due to gravity. Thus it cannot be guaranteed in every case that milling material is present at the ends of the discharge unit and can be discharged to the ends of the rolls. If there is no milling material is conveyed into the milling gap at the ends of the rolls, serious damage may occur. Also part of the prior art are distribution devices (for example, paddle rolls), which support transportation of the milling material to the ends of the discharge unit. One of the disadvantages of the all the systems forming the prior art is that this distributor function cannot be controlled or regulated automatically in operation and independently of the milling material. Disadvantageous in such roll stands is that the operator must manually define the filling height as the target level. This "empirical" setting of the target level must also ensure that the distribution of milling material is guaranteed along the length of the feed roll. Testing/monitoring the distribution of milling material along the feed roll is only done visually, if at all. In operation, it happens that if an unsuitable target level is selected and/or with unsuitable presetting of the distribution unit, the milling material does not get to the ends of the discharge unit. The correct setting is also difficult for a person skilled in the art. With milling material properties changing in operation, with critical passages with the prior art, the risk of a fault is even greater. On the other hand, it is important that the milling material is not segregated with central introduction of the product, as the product is not mixed in the inlet. The risk of segregated milling material in the inlet is particularly present if, due to two or more infeeding tubes, different milling material qualities flow into the inlet.

Without looking at the specific properties of the cereal mills, in all the milling systems of the prior art discussed, it is known (see e.g. DE-OS 27 30 166), that there are and can always be disrupting effects that do not allow ideal milling conditions. These disruptive effects include non-uniform roll temperatures, change of spring characteristic of a roll pair, change of the milling gap or milling pressure etc. The invention particularly relates to a control and regulation device for stable, adaptive control and regulation of the milling systems described for milling cereals and to affect process elements (milling material and system elements) and these assignable operative process parameters of the cereal mill installations with timely detection of disrupting influences or other operative anomalies. It is known that the provision and automation of such control and regulation systems is complex, as a variety of at least partially mutually dependent, i.e. correlated parameters have to be considered (e.g. EP0013023B1, DE2730166A1). So the operation of the milling devices is affected by a plurality of parameters, such as, e.g., by the selection of the type of cereal or the cereal mixture and the cultivation region, the harvest time, the desired quality criteria, the specific weight and/or moisture of the individual cereal varieties or even the proportions of cereal mixing, the air temperature, the relative humidity, the technical data of the installation elements used in the milling installation and/or the desired flour quality as specified process quantities and the selection of the distance, the milling pressure, the temperature and/or the power consumption of the milling roll motors, the flow rate and/or the achieved moisture of the milling material and/or the quality of the flour in relation to the mixing proportions, which make sufficiently differentiated control of the milling process in the cereal milling installations more difficult. Frequently it is simply enough for a few of these process quantities and operative process parameters to slip outside their tolerance to have a massive effect on the operation of the mill. This complexity of the process is to be thanked for the fact that, in spite of all efforts for automation of the installations, the senior miller is still present as they, as "human expert", have to decide whether a change of the control signals respectively assigned to the input signal quantities appears desirable or not. In so doing, the senior miller always considers the target parameters. If they have found an optimal assignment between the input signal quantities mentioned and the control signal quantities then this assignment is typically guaranteed by corresponding memory assignment and addressing within the cereal milling installation.

Generally, the high milling plant known today is characterised by a repeated milling and sifting after each milling passage. This applies both in the soft wheat and durum wheat mills and in the maize mill. In earlier processes, this procedure was repeated 15 to 20 times. Systems today achieve the same result with good operational guidance with milling twelve to fifteen times. In so doing, a good operator/miller is in a position, even from highly varying raw materials, by mixing the various cereal qualities and targeted milling guidance, particularly by the very careful step-by-step conclusion of the various parts of each cereal grain, to achieve the quality required, e.g., by the further processing technologies, bakers, pasta factory etc. To satisfy the requirements demanded, a milling installation must work out, for a certain quantity of raw material, i.e. milling material, a certain quantity of milling end products with corresponding quality and product parameters, wherein a cereal mill is always endeavoured, to achieve as high as possible yield of milling product (e.g. flour, semolina etc.) Only by keeping to the required quality criteria and framework parameters is the operation of a milling installation good. An essential aspect is the extent of required operating resources which in the mill, e.g., directly depends on the number of milling and screening passages. All efforts of recent times show that in high milling without directly decreasing, whether it is the yield of the milling product quality, the milling cannot be further shortened or optimised without further ado, so that in relation to this, a slowing down of the development of the miller's milling process and the control of such milling installations can be established.

Particularly for dynamically responding process control systems for process technology control and operation of the milling installations, in all milling processes there is a lack of corresponding solutions, if it relates to the automation of the material transports or complex batch processes within the milling installation or milling passage. Difficulty is also provided in obtaining the process safety through the production/process and distribution control system. The traceability of milling end product up to the supplier of the raw materials/milling material required by the legal provisions and mostly required for certifications can mostly not be sufficiently guaranteed by the prior art devices. This particularly relates to areas of automation and control of cereal mills such as installations of the food, compound feed and feed industry.

Document EP 0013023 A1 of the prior art discloses a process for milling cereals and corresponding cereal milling installations. EP 0013023 A1 relates to making guidance of the process and cereal milling easier by the senior miller and better division of work between the senior miller and control system. For the process, it is started with (i) specified process parameters such as humidity, air temperature, cereal variety etc., (ii) target parameters such as yield, ash content or moisture of the end product, and (iii) operational process parameters such as parameters controllable and able to be regulated within a milling process such as roll gap, roll pressure or roll speed, that are designated in their entirety as process parameters. The input signals for controlling installation elements of the milling installation are based on a qualitative and quantitative evaluation of the process parameters. EP 0013023 A1 is consciously based in its teaching on including the senior miller, therefore the human, in the process guidance of the cereal mill. In other words, the invention must be means to ensure a stable guidance of the mill and improved adherence to the target parameters by the senior miller. Through the invention, process parameters which are suitable for computer-aided assessment and/or the effect of which on possible settings of the input signals for control is calculable, are summarised in appropriate groups and used groupwise as input signal parameters for control by means of assigned control signals. The senior miller memorises the process guidance, but obtains support from the input signal parameters generated on the basis of measured data. In this, the sub-division of the parameters allows a transparent cooperation between the senior miller and automated signal parameter generation. DE 10 2008 040 095 A1 shows an installation for processing of cereals. The installation according to the invention comprises a global regulation system extending over a large part of the units of the installation and a local regulation system that is assigned to a relevant unit. The installation is regulated by applying fixed global regulation sets and fixed local regulation sets which produce the configuration of the installation. End products and desired properties are defined by the senior miller in the system and specify the product recipe. The processing units of the installation are provided with sensors, the results of which are directed to the senior miller for local or global regulation (e.g. as visual or audible alarm). The sensor information directed to the senior miller in this case considers the local and global installation configuration and product recipe. WO 2014/187799 A1 finally shows a process for cereal milling by means of a milling installation. By means of a process simulation module, based on the settings of the installation defined by means of the operating parameters, yield and property parameters of resulting flour are simulated. Based on the simulated flours, the closest trading flour is assigned with the smallest deviation from the yield, property and tolerance parameters. Starting with simulated flour, a quality value is calculated for each of the flours. Iteratively, the operating parameters in the process simulation module are extended until sufficient quality value is achieved for the resulting trading flour.

SUMMARY OF THE INVENTION

It is an objective of the present invention to solve the disadvantages and technical problems known from the prior art. In particular, an optimised, particularly intelligent and/or adaptive control/regulation device for optimisation and simple control of the milling line and/or passages of a roll system are provided, with which the milling and/or grinding can be undertaken optimised and automated. In so doing, the operational safety of a mill must be increased and at the same time, the operation must be optimised. Particularly, the work of an operator must be technically simplified and more milling installations can be operated by the same operator.

Furthermore, the technical means must be provided to be able to respond to anomalies occurring quickly, particularly in real-time or quasi-real-time, and passages and/or milling installations can automatically record encompassing effects and operation can be adapted accordingly.

According to the present invention, these targets are achieved in particular by the elements of the characterising part of the independent claims.

Particularly, these targets are achieved by the invention for a milling installation comprising one or more mills with one or more processing lines for the industrial production of a plurality of milling products, in that a processing line and/or passage comprises at least one milling passage (B, C) with milling roll pairs ($B_1$ ($B_{11}/B_{12}$), $B_2$, $B_x$: $C_1$ ($C_{11}/C_{12}$), $C_2$, $C_x$) for milling a milling material and at least one downstream screening passage (S) for sifting or screening the milling material, that, through a processing line a specific milling product with specific yield parameters and milled product parameters can be produced and wherein each mill of the milling installation comprises at least one programmable logic controller (PLC) for local control and/or regulation of the processing devices ($B_x/C_x/S_x$) assigned to the processing lines through allocated I/O interfaces, that the milling installation comprises a central regulation and control device for optimised control of the milling installation, wherein the programmable logic controllers (PLC) are connected bidirectionally by network interfaces (202) to the central regulation and control device and can respond to the transferred control parameters by means of the central regulation and control device and that the processing devices ($B_x/C_x/S_x$) of a processing line can be actuated based on the transferred control parameters of the regulation and control device by means of the programmable logic controllers (PLC) remotely through the assigned I/O interfaces and the operation of which is regulated individually in an optimised way and/or remotely controlled. The remote control and regulation of the processing devices ($B_x/C_x/S_x$) of local machine processes of the processing devices ($B_x/C_x/S_x$) may, e.g., be done by means of the regulation and control device in real-time data exchange. The regulation and control device may, e.g., comprise a network interface, by means of which the regulation and control device accesses a control system of the mill comprising the programmable logic controllers (PLC) and the network interfaces. The central regulation and control device may furthermore comprise means of generating the control parameters to be transferred depending on passage-specific and/or passage-encompassing batch parameters, wherein by means of at least one of the control parameters based on one or more of the passage-specific and/or environment-specific parameters, various milling lines with assigned processing devices ($B_x/C_x/S_x$) are optimised centrally by means of the regulation and control device and/or are individually regulated. The passage-encompassing parameters may, for example, comprise location-dependent measurement parameters humidity and/or air pressure and/or ambient temperature and the passage-specific parameters may, for example, comprise local operating parameters of the processing devices ($B_x/C_x/S_x$) comprising energy consumption of the milling roll pairs ($B_1$, $B_2$, . . . , $B_x$: $C_1$, $C_2$, . . . , $C_x$) and/or preliminary pressure and/or input temperature of the milling material. By means of the regulation and control device, e.g., the passage-encompassing parameters may globally, i.e. device-encompassing, be optimised and regulated for at least two milling passages, while the passage-specific parameters are optimised and regulated independently in relation to the relevant milling passage. The central regulation and control device may, e.g., comprise operational process recipes wherein, based on an operational process recipe, a batch control with a defined processing sequence of the processing units ($B_x/C_x/S_x$) of one of the milling lines or passages is regulated and/or controlled and wherein, based on the operational process recipe a defined quantity of an end product with specific property parameters is generated from one or more input materials with specific property parameters. During the milling process of an operational process recipe, the operational control parameters and/or the batch parameters are monitored continuously by means of the regulation and control device, wherein where a definable parameter value fluctuation or anomaly is detected as defined deviation of the monitored control parameters and/or the batch parameters from defined control parameters and/or batch parameters, the control parameters are corrected and/or adapted automatically by means of the regulation and control device. The passage-specific measurement parameters may, e.g., furthermore, comprise at least measurement parameters relating to the flows and/or power consumption of one or more roll stand of the milling installation. The one of more roll stands may be, for example, fluted rolls ($B_1$ (i.e. the roll pair $B_{11}$, $B_{12}$), $B_2$ ($B_{21}$, $B_{22}$), . . . , $B_x$ ($B_{x1}$, $B_{x2}$)) and/or smooth rolls ($C_1$ (i.e. the roll pair $C_{11}$, $C_{12}$), $C_2$ ($C_{21}$, $C_{22}$), . . . $C_x$ ($C_{x1}$, $C_{x2}$)). The passage-specific measurement parameters may, e.g., comprise at least measurement parameters relating to the flows and/or power consumption of all roll stands of the mill. By means of process-typical operational control parameters of an optimised batch process, e.g., quality parameters of the end product may be defined in the standard range and specific flour yield may be determined depending on the input products. As a result, deviations from the standard range can be triggered and detected. The defined property parameters of the end product may, furthermore, e.g., comprise at least particle size distribution and/or starch damage and/or protein quality and/or water content. The monitored, operational control parameters and/or the batch parameters may, e.g., comprise at least yield and/or energy consumption and/or throughput/machine runtime. The central regulation and control device may, e.g., comprise a displayable single web-based monitoring system of various milling lines, by means of which the milling installation is monitored and/or controlled centrally in an optimised way. A monitoring or control display of the control system of the operating device and/or the regulation and control device may, e.g., also comprise a proximity sensor and/or motion sensor, wherein the display is switched on and off automatically depending on the measurement results of the proximity sensor and/or motion sensor of the milling installation based on the measured distance to an operator of the milling installation and/or the mill. As well as the energy-saving function, this allows the service life/operating time of the display to be increased considerably.

Particularly, one of the advantages of the invention is that milling installations can be optimised in a novel way encompassing the device. The process function or even processing function must be optimised as much as possible after a suitable selection of milling passages of a milling installation for a certain milling material, and be reproducible for the operation of the installation. However, as typically neither the reduction behaviour can be characterised uniquely, nor the effects of the process or even operating parameters on the particle properties are unambiguously predictable, i.e. how and in what dependency the throughput, speed or even specific energy, energy consumption of the milling devices or geometric parameters of the milling installation affect the properties, particularly the dispersity properties of the milling product, is decisive for optimised regulation of the operating parameters. Through the central control possibility by means of the device according to the invention and separated control possibility for passage-specific and global operating or process parameters, a novel type of optimised operation of milling installations is possible which relates to an efficient control and parameter-based adaptation of the operation in real time.

BRIEF DESCRIPTION OF THE DRAWINGS

In the following, illustrative examples of the present invention are described using examples. The examples of the illustrative examples are illustrated by the following appended drawings.

Figure 1:
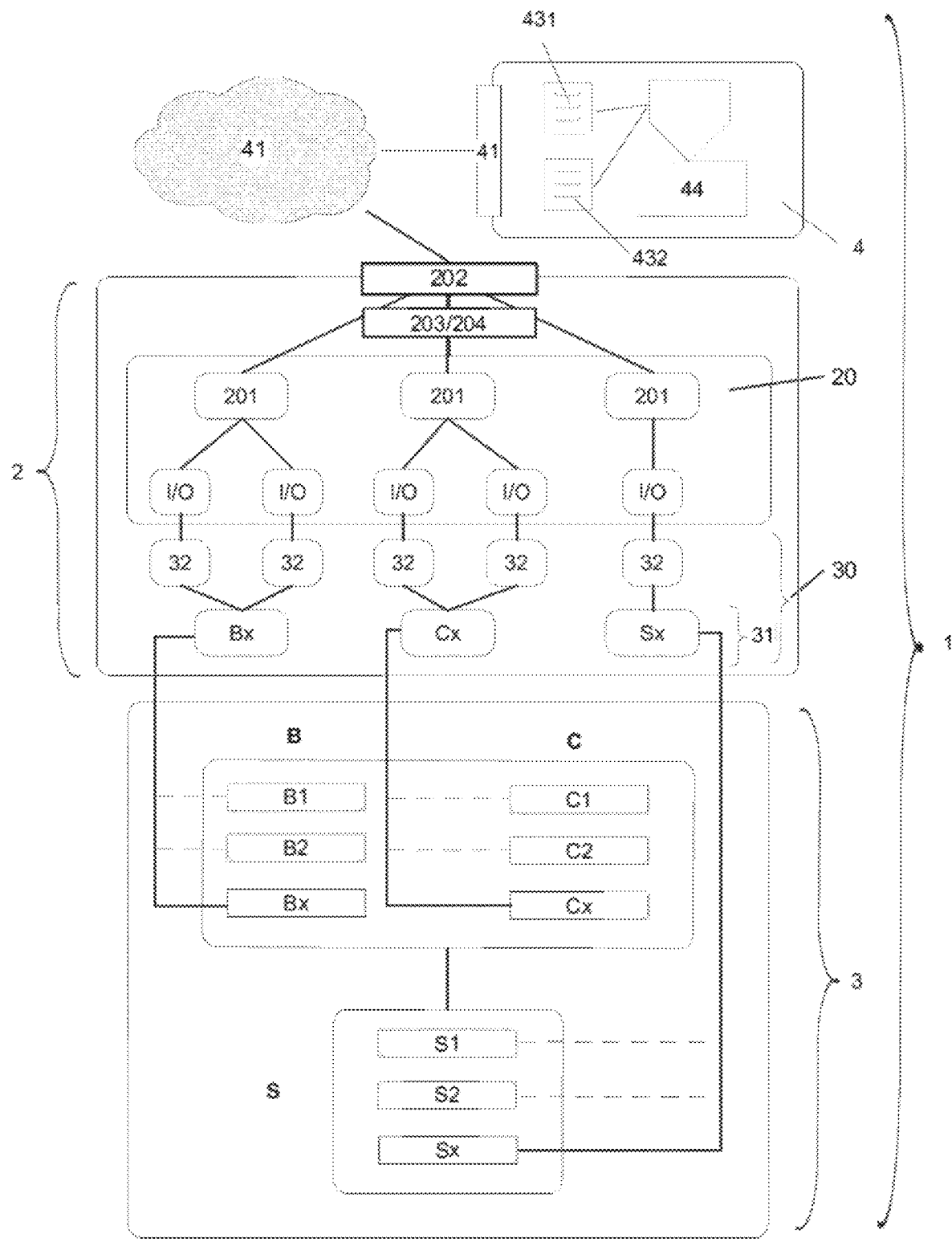
FIG. 1 illustrates schematically a representation of an illustrative example according to the invention in which, e.g., the passage 3 with the roll stands ($B_x/C_x$) are regulated and/or controlled and/or monitored, subdivided into B passage (here: fluted rolls $B_1$ (roll pair $B_{11}$, $B_{12}$), ..., $B_x$ ($B_{x1}/B_{x2}$)) and C passage (here: smooth rolls $C_1$ (roll pair $C_{11}/C_{12}$), ..., $C_x$). The milling installation 1 comprises one or more mills or operation devices 2 (plants) with respectively one or more processing line/passage 3 for industrial manufacture of various milling products. In this case, a processing line or passage 3 may comprise at least one milling passage B, C, with milling roll pairs $B_1$, $B_2$, ..., $B_x$; $C_1$, $C_2$, ..., $C_x$ for milling a milling material and/or at least one downstream screen passage $S_1$, ..., $S_x$ for sifting or sieving the milling product. Through the milling line 3 a specific milling product with specific yield parameters and milling product parameters is produced. Each operating device or mill 2 of the milling installation 1 comprises at least one remote-respondable, programmable logic controller 201 (typically designated as PLC) for local control and/or regulation of processing devices $31/B_x/C_x/S_x$ assigned to one or more milling lines 3 through assigned I/O interfaces 32. The control device 4 controls centrally, particularly, for example, web-based, the processing devices 31 of several passages 3 of one or more mills 2.

Through a display, e.g., the momentary gap value of two milling rolls can be monitored. Furthermore the servomotors can be automatically operated via a control device and storage medium, wherein both can be realised as integrated component of the control system 20 of the operating device. Particularly, the servomotors 337 and therefore the milling gap setting devices 3314, 3317, 3324, 3327 may also be monitored, controlled and automatically regulated as well as the product control system 3332 and the sensors 3331 as processing units 31 and I/O interfaces 32 by means of the control system of the operating device 20.

FIG. 4 illustrates schematically an excerpt from the "global" i.e. passage-encompassing, and the passage-specific parameters 43211, . . . , 4321x/43221, . . . , 4322x. Dark grey are passage-encompassing relevant parameters 43221, . . . , 4322x, light grey are passage-specific parameters 43211, . . . , 4321x. By the global or passage-encompassing parameters 43221, . . . , 4322x are understood in the following, parameters which have the same or corresponding effect in various processing lines or passages 3 with the processing devices 31, for example, because of their geographical allocation or device-specific equivalence. According to the invention, they are used centrally by the regulation and control device 4 to generate the control/regulation and monitoring of several processing lines 3. In comparison to this, the passage-specific parameters 43211, . . . , 4321x are only relevant specifically for a certain processing line 3 or even specifically for one of the processing devices 31.

Figure 5:
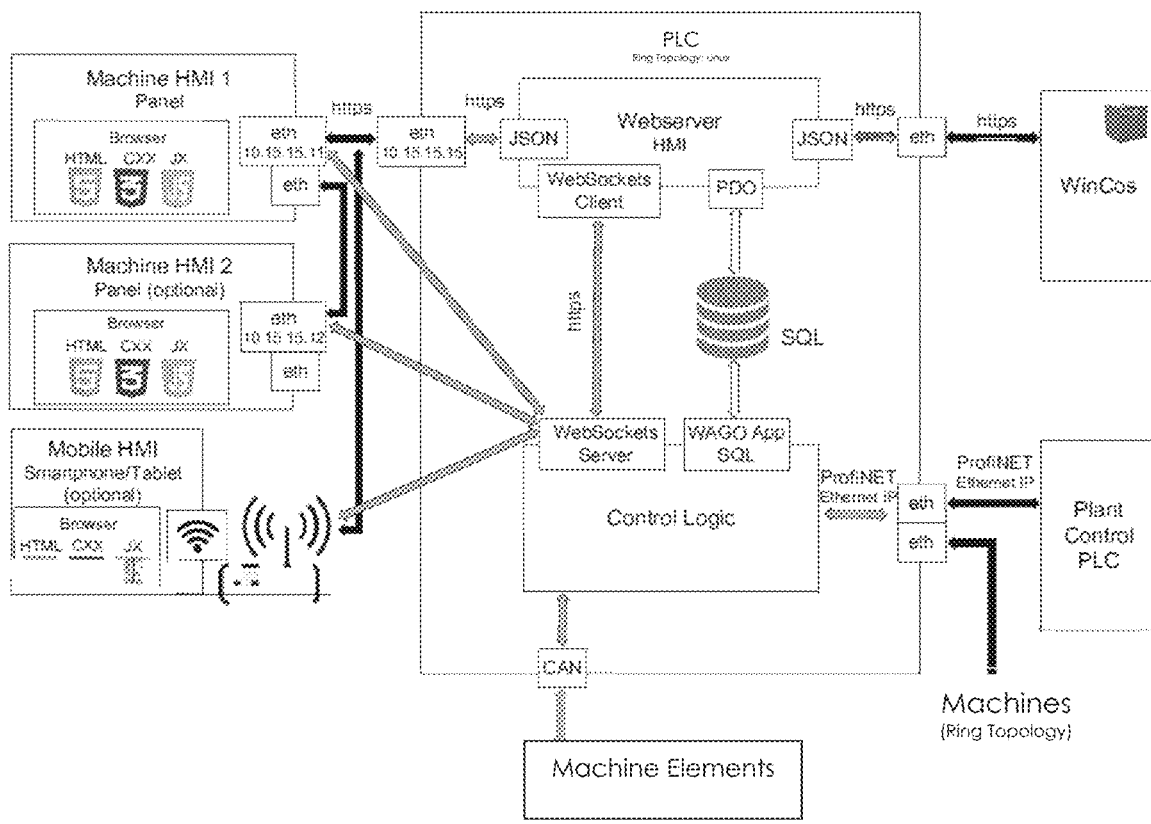

FIG. 5 illustrates schematically a block diagram of an illustrative example according to the invention with a mobile application with human-machine interface (HMI) identification for remote operation of machines without local operating panel and remote access by means of the mobile app on the web server for remote machine control by means of the control device 4. The control device 4 controls centrally the processing devices 31 of various passages 3 of the same or different mills 2 and/or processing devices 31 of the same or different milling installations 1 or general installations of the process industry, by them responding to the local PLC 201 of the processing lines 3.

DETAILED DESCRIPTION OF THE INVENTION

FIG. 1 illustrates schematically a representative of an illustrative example of the invention in which, for example, the passage or processing line 3 with the roll stands (Bx/Cx) is controlled and/or monitored, here, for example further subdivided into B passage (here: fluted rolls B1 (roll pair B11, B12), . . . , Bx (Bx1/Bx2)) and C passage (here: smooth rolls C1 (roll pair C11/C12), . . . , Cx). Such processing lines or passages 3 may, e.g., also comprise processing units 31 other than roll stand. Generally, passages (also strand or run-through) designates the product introduction into a mill, e.g. a cereal mill. In this case, cereal milled with roll stands or grainy material is screened with an oscillating sifter. The flour is screened away and the grist is milled again until all the flour has been broken away. This product guidance (milling and then sifting) is designated as passage here. The cereal and the grainy product may (according to the milling diagram) run through 10-16 passages. However, the invention generally relates to process-controlled processing lines of installations of the process industry. As installations of the process industry are herein installations for industrial processing of substances and materials in chemical, physical, biological or other technical processes and procedures. In this, substances and materials are, for example, implemented, formed, mixed or separated, cast, milled, pressed or many more through the corresponding processing lines. Several typical processes are chemical reactions and the preparation of reaction products such as by distillation or crystallisation, the production and processing of chocolate, crude oil preparation such as by rectification, melting of glass, but also milling grainy material (e.g. organic material such as cereals or also inorganic material such as rock) or industrial baking of bread or manufacture and processing of pasta (e.g. industrial manufacture of pasta) etc.

However, the present invention is essentially, for example, explained for other processing installations using milling installations. Reference number 1 designates the milling installation or generally a processing installation comprising one or more mills or operating devices 2 (plants) respectively with one or more processing lines 3 for the industrial manufacture of various milling products or other products processed by means of the processing line. A processing line 3 may, for example, comprise at least one milling passage B, C, with milling roll pairs $B_1, B_2, \ldots, B_x$; $C_1, C_2, \ldots, C_x$ for milling a milling product. The selection of the milling or reducing plant 1 may be determined by the metrological characterisation of the initial product and/or end product and/or quantity specifications for the initial product.

In particular, in the selection of the milling installation 1 frequently few parameters such as, for example (i) is the product dry, moist or wet, (ii) is the product hard, brittle or plastic, (iii) particle size of the initial product, (iv) fineness of the end product, (v) product throughput etc. are sufficient. As mentioned above, at least one roll, particularly two rolls 31 of a milling roll pair of a milling installation 1 or processing line 3, may be designed as smooth roll $C_1$, $C_2 \ldots$, Cx or as fluted roll $B_1, B_2, \ldots$, Bx or as roll base body with plates screwed on. Smooth rolls $C_1, C_2, \ldots$, Cx may be cylindrical or dished. Fluted rolls $B_1, B_2, \ldots$, Bx may exhibit various fluted geometries, e.g. roof-shaped or trapezoidal fluted geometries, and/or exhibits segments superimposed on the circumferential surface. At least one roll, in particular both rolls of the milling roll pair, in particular at least one milling roll, in particular both milling rolls of milling roll pair, may have a length in a range of 500 mm to 2000 mm and a diameter in a range of 250 mm to 300 mm. The circumferential surface of the roll, in particular the milling roll, is preferably irremovably connected to the roll body and in particular is formed as one part therewith. This allows simple manufacture and reliable and robust processing, in particular milling, of the product. The rolls may be designed with at least one sensor for recording measurements characterising a condition of at least one of the rolls, in particular both rolls of the roll pair. In particular, this may be a condition of a circumferential surface of at least one of the rolls, in particular both rolls of the roll pair. The condition may be, for example, a temperature, a pressure, a force (force component(s) in one or more directions), wear, a vibration, a deformation (extension and/or deflection path), a rotational speed, a rotational acceleration, an ambient humidity, a position or orientation of at least one of the rolls, in particular both rolls of roll pair. The sensors may be designed, for example, as a MEMS sensor (MEMS: Micro-Electro-Mechanical System). The sensor is preferably in data connection with at least one data sensor transmitter, wherein the data transmitter is designed for the contactless transmission of the measurements of the at least one sensor to a data receiver. With the aid of the at least one data transmitter, the measurements can be transmitted contactlessly to a data receiver which is not part of the roll. The milling installation may comprise other sensors and measurement units for recording process or product or operating parameters, particularly measurement devices for measuring the current/power consumption of one more rolls. Among other things, the sensors may be (i) at least one temperature sensor, but preferably several temperature sensors for measuring the roll temperature or a temperature profile along a roll; (ii) one or more pressure sensors; (iii) one or more force sensors (to determine the force component(s) is one or more directions); one or more wear sensors; (iv) one or more vibration sensors, particularly for determining a twist, therefore an adhesion of the product to be processed on the circumferential surface of the roll which hinders processing, particularly milling at this position; (v) one or more deformation sensors (to determine an extension and/or a deflection path); (vi) one or more rotational speed sensors, particularly for determining a stationary condition of the roll; (vii) one or more rotational acceleration sensors; (viii) one or more sensors for determining ambient humidity, preferably arranged on an abutting side of the roll; (ix) one or more gyroscopic sensors for determining the position and/or the orientation of the roll, particularly for determining the position and/or orientation dependent on the width of the gap between both rolls of the roll pair and the parallelism of the rolls; and/or (x) one or more sensor for determining the width of a gap between both rolls of the roll pair, particularly a milling gap between both milling rolls of the milling roll pair, for example, a sensor arranged in an abutting side of the roll, particularly an MEMS sensor. Any combinations of this are also possible. For example, a roll may contain several temperature sensors and deformation sensors. It is also possible and in the context of the invention that all sensors are of the same type, therefore, for example, designed as measurement units for measuring the power consumption or one or more rolls.

Furthermore, the one or more processing lines 3 comprise at least one downstream passage $S_1, \ldots, S_x$ for sifting or screening the milling material. Milling rolls in the sense of the present invention are designed to mill grainy milling material which is normally directed between a milling roll pair of two milling rolls. Milling rolls, particularly the milling rolls of the milling roll pairs according to the invention usually have one essentially inelastic surface (particularly on its circumferential surface) which, for this purpose, may contain metal or may be made of it, such as steel, particularly stainless steel. Between the milling rolls of the milling roll pair there is usually a relatively solid and frequently hydraulically-controlled milling gap. In many milling installations, the milling material is essentially directed vertically downwards through such a milling gap. Also the milling material is directed in many milling installations 3 to the milling rolls of a milling roll pair by means of its gravitational force, wherein this infeed may optionally be supported pneumatically. The milling material is usually grainy and moves as a flow of fluid through the milling gap. Through these properties, a milling roll and a milling installation 3 containing at least one such milling roll is differentiated from other rolls used in technology, for example, which are used to transport paper.

Through a milling line 3 a specific milling product with specific yield parameters and milling product parameters is produced. These parameters particularly depend on the selection of the milling installation 1 of processing device. By "product" or "milling material" in the sensor of the invention particularly bulk goods or a mass is understood. By "bulk goods" in the sense of the present invention a powdery, granular or pellet-formed product is understood which is used in the bulk goods processing industry, i.e. in the processing of cereals, cereal milling products and cereal end products of the milling industry (particularly milling soft wheat, durum wheat, rye, maize and/or barley) or special milling industry (particularly shelling and/or milling of soya, buckwheat, barley, spelt, millet/sorghum, pseudo-cereals and or legumes), the manufacture of feed for livestock and pets, fish and crustaceans, the processing of oil seeds, the processing of biomass and manufacture of energy pellets, industrial malting and malt handling installations; the processing of cocoa beans, nuts and coffee beans, the manufacture of fertilisers, in the pharmaceutical industry or in the chemistry of solids. By "mass" in the sense of the present invention is understood a food mass, such as a chocolate mass or a sugar mass, or a printing ink, a coating, an electronic material or a chemical, particularly a fine chemical. By "processing of a product" is understood in the sense of the present invention particularly the following: (i) milling, reducing and/or flaking of bulk goods, particularly cereals, cereal milling products and cereal end products of the milling industry or special milling industry as mentioned above, for which as milling roll pairs, for example, the pairs of milling rolls or flaking rolls described in more detail below may be used; (ii) the refining of masses, particularly food masses such as chocolate masses or sugar masses, for which, for example, pairs of fine rolls may be used; and (iii) wet milling and/or dispersing, particularly of printing inks, coatings, electronic materials or chemicals, particularly fine chemicals.

Each operating device or mill 2 of the milling installation 1 comprises at least one remote-respondable, programmable logic controller 201 (also PLC) for local control and/or regulation of the processing devices $31/B_x/C_x/S_x$ assigned to the milling lines 3 through assigned I/O interfaces 32. The control device 4 controls centrally, particularly, for example, web-based, the processing devices 31 of various passages 3 of the same of different mills 2, by the local PLC 201 responding to the processing lines 3. In so doing, passage-specific $43211, \ldots, 4321x$ and global, i.e. passage-encompassing $43221, \ldots, 4322x$ parameters are differentiated and handled differently by the control device 4 (see also FIG. 4 with an excerpt of "global", i.e. passage-encompassing and passage-specific parameters $43211, \ldots, 4321x/43221, \ldots, 4322x$, wherein passage-encompassing relevant parameters $43221, \ldots, 4322x$ are highlighted in dark grey, whereas passage-specific parameters $43211, \ldots, 4321x$ are highlighted in light grey.). By global or passage-encompassing parameters $43221, \ldots, 4322x$, parameters are understood which, on various processing lines or passages 3 have the same, corresponding or at least passage-encompassing relevance to the processing devices 31, for example, because of their geographical allocation or device-specific equivalence. According to the invention, they are used centrally by the regulation and control device 4 for generating the control/regulation and monitoring of several processing lines 3. In comparison with this, the passage-specific parameters $43211, \ldots, 4321x$ are only specifically relevant to a certain processing line 3 or even specifically relevant to one of the processing devices 31. The programmable logic controllers 201/PLC are connected bidirectionally via network interfaces 202 to the central regulation and control device 4 and can be responded to by means of the control parameters $4311, \ldots, 431x$ transferred by means of the central regulation and control device 4. The processing devices $31/B_x/C_x/S_x$ of a processing line 3 are actuated based on the transferred control parameters $4311, \ldots, 431x$ of the regulation and control device 4 by means of the programmable logic controllers 201/PLC remotely via the assigned I/O interface 32 and their operation is regulated locally individually.

The process technology link of the measurement parameters for characterisation of the input product and/or end product and/or quantity specifications for the input product and/or throughput etc. can be done with the control parameters 4311, . . . , 431x for controlling the processing devices 31/$B_x$/$C_x$/$S_x$ of a processing line 3 by the central regulation and control device 4, i.e. the passage-specific 43211, . . . , 4321x and globally, i.e. passage-encompassing 43221, . . . , 4322x parameters, for example, by means of a predetermined process function. This means that the process function is the technical, particularly, for example, time-dependent, configuration of the processing process of a specific milling installation 1 and/or processing line/passage 3 and/or processing unit 31 during the processing process and allows a technical context to be produced between the parameters affecting the processing process, such as, for example, measurement parameters relating to the initial product (moisture, graininess, etc.), environmental influencing parameters (air pressure, temperature etc.), measurement parameters relating to intermediate products during the processing process and operating parameters such as, for example, energy consumption, roll temperature, rotational speed of the rolls, and measurement parameters of the end product (milling fineness, graininess, throughput, etc.). The determination of the corresponding process function, at least the initial determination, may be done experimentally for the relevant type of a milling installation 1, for example, by means of an actual milling installation, as it is frequently difficult to characterise the reducing behaviour uniquely and/or to predict the effects of process parameters on the particle properties. For example, it is mostly difficult to connect throughput, rotational speed/specific energy or geometric parameters of the mill with the dispersity properties of the end product with mapping functions. In this case, the process function must be based on all the process-relevant quantities and parameters, particularly the permitted bandwidths of the process parameters and control parameters 4311, . . . , 431x, within which a safe operation of the milling installation 1 or even the processing device is guaranteed. The experimental, metrological quantities for determining the process function may be, for example, particle size distribution inside the processing line 3, effect of rotational speed, throughput, effect of milling body thickness and size on particle size distribution. In this case, the process function may, for example, be determined for all process stages of the process change of the processing line 3, to obtain the integral process function of the milling installation 1.

The central control system 4 of the passage devices 31 may particularly be based on web technology, i.e. decentralised network technologies, which enables collective parameter changes and collective software updates through any number of passages 3 web and/or network-based, and provides the interconnectivity to various terminals. The collective parameter changes and collective software updated over any number of passages 3, and the interconnectivity to various passage devices 31 as terminals are advantages of the centrally-formed control system of passage devices 31 according to the invention. Passage-encompassing parameters 43221, . . . , 4322x are assigned to the operation regulation of the batch is several processing lines/passages 3, but in contrast to the passage-specific parameters 43211, . . . , 4321x are not connected to an individual, determined processing line/passage 3. Passage-encompassing parameters 43221, . . . , 4322x may directly be measurement parameters of corresponding measurement devices or sensors, or be generated by corresponding link or models from other passage-encompassing parameters 43221, . . . , 4322x and/or passage-specific parameters 43211, . . . , 4321x.

Figure 2:
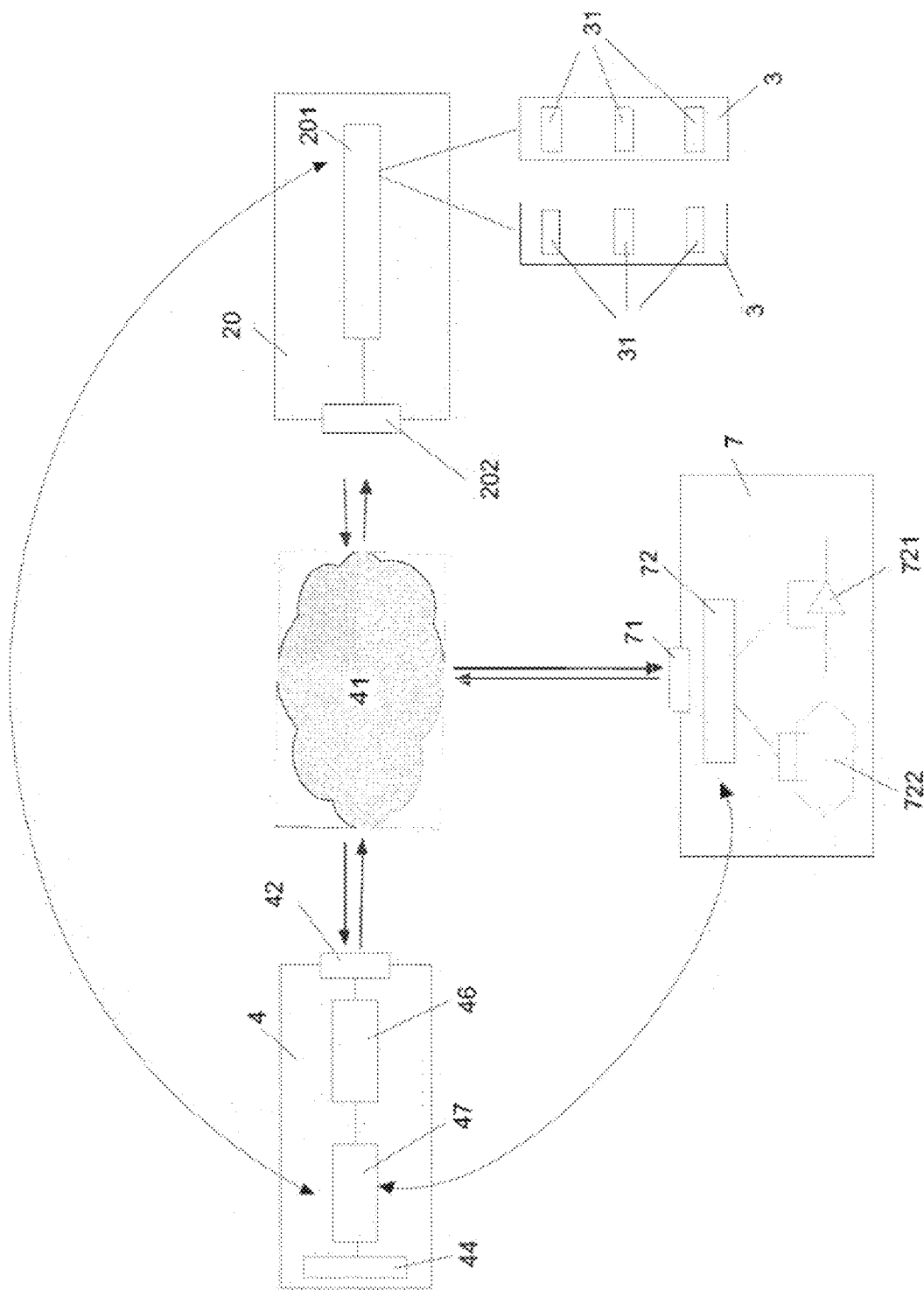
FIG. 2 illustrates schematically a representation of an illustrative example according to the invention, in which the regulation and control device 4 is connected by an interface 42 to the worldwide backbone network, i.e. the Internet, and/or an Intranet. The regulation and control device 4 is connected by means of the network interface 42 via a data transmission network 41 and the network interface 202 to the control system of the operating device (plant control system) 20. A web server application 72 provides the desired display and input/output options and/or control/monitoring pages 721/722 for a remote client 7 or browser, wherein the remote client 72 is connected to the network 41 by means of the network interface 71. The regulation and control device 4 also provides the necessary data services or interfaces to enable data exchange between the local regulation and control device 4 as machine/process server and the remote system 7 as client. In this illustrative example, the single prerequisite for a remote viewing of the data and/or web pages of the web server 72 is that a standard browser interface is required. If a programmable logic controller (PLC) 201 is used in the control system 20 of the operating device 2, e.g. the mill, an optimisation or any company-specific control software for the real-time data exchange with the control system 20, compatible data exchange services are needed. For example, the PLC 201 may be able to respond in a standardised or proprietary way by means of a Control Client (e.g. OPC UA Client) and a corresponding interpreter of the regulation and control device 4 via a corresponding protocol (e.g. OPC UA). In this illustrative embodiment, the web server/data service 46 (for example, realised as a thin server) provides the connection between the operating device 2 (e.g. realised as a thin client) or even process and the Internet. The PLC 201 or a proprietary controller comprise the plant control system 20 by means of which the processing units 31 of the processing line 3 can be controlled and/or regulated. Most PLCs, such as PLCs from AB, Schneider/Modicon or Siemens, for example, support at least one serial connection with corresponding communication protocols of the PLC manufacturer or third-party provider. Typically, the relevant data transfer driver of the thin server manufacturer are provided as embedded software applications. For certain illustrative examples, which need PLCs, optimisations or company-specific software/protocols for the data exchange in real time, a corresponding remote server and compatible data exchange services may be needed.
Figure 3:
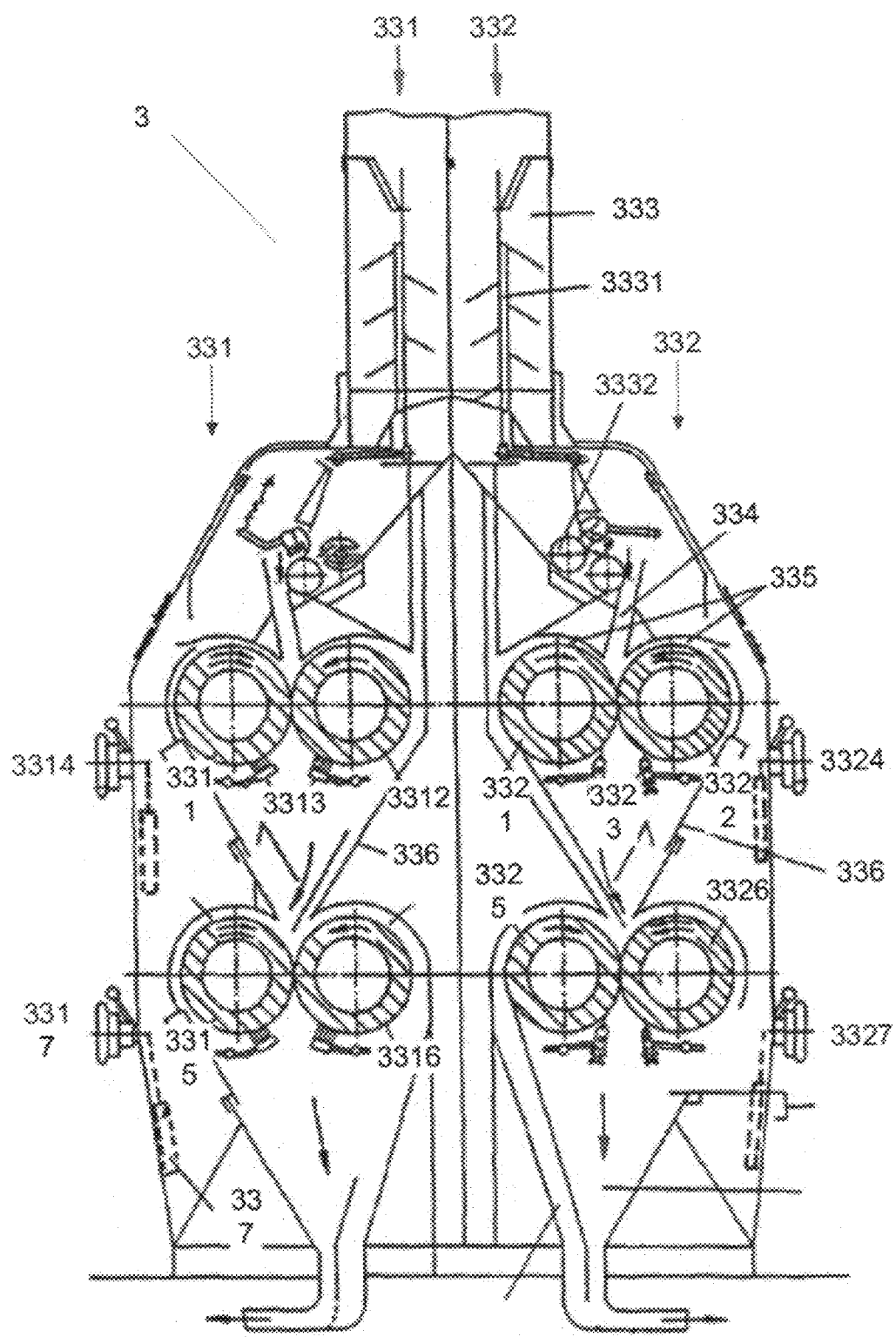
FIG. 3 illustrates schematically a representation of a processing line 3 based on a roll stand 33 with 8 milling rolls, such as is known in the prior art. Such an eight roll stand 33, e.g., consists of two halves, with a left half as grist passage 331 and a right half as comminution passage 332. The grist passage 331 may comprise, for example, fluted rolls 3311/3312, wherein in FIG. 3 the faster running roll 3311 is marked with two arrows. Underneath each of the rolls 3311 and 3312 is located a stripper brush 3313. In the comminution passages 332 multiple smooth rolls 3321 or 3322, and to keep the surface of the roll clean stripper knife 3323, are used. Depending on the specific milling work, the respective lower roll pair 3315, 3316 or even 3325, 3326 are formed as the same type of roll coarsely fluted, finely fluted or as smooth rollers, as the corresponding upper one. The material may, e.g., be directed by corresponding infeed cylinders 333 left or right into the roll stand 33. In so doing, for example, for high milling powers, the left and right half of the roll stand may be designed to be identical, so that both halves each process half of the milling product. In the feed cylinder 333, e.g., a sensor 3331 may be formed that controls a product feed 3332, so that a respective arriving quantity of material, that flows above into the feed cylinder 333, is discharged in the same quantity through the product feed system. The material is directed through a feed channel 334 directly into the roll gap. An air flow is generated in the feed channel 334 that can be secured by two air channels 335 directed around the rolls 3311, 3312 or even 3321, 3322. The material ground by the upper roll pair 3311, 3312 is directed via a product removal funnel 336 directly into the milling gap of the lower roll pair 3315, 3316. Also in the lower roll pair 3315, 3316 air is aspirated through air channels 335. All four roll pairs 3311, 3312, 3315, 3316, 3321, 3322, 3325, 3326 may be set by a setting device 3314 and 3317 or even 3324 and 3327 in relation to the milling gap. All other devices such as securing against foreign bodies, engaging and disengaging device etc. may be used in eight-roll plants, for example, as in four-roll plants. In the product removal funnel, air guidance can also be realised. This may bring advantages, particularly for coarse-grained flour and flour milling products, as by separated air and product guidance, more compact guidance of the falling product flow is possible. Each milling roll pair 3311, 3312-3321, 3322 each exhibits their own milling gap setting device 3314, 3317, 3324, 3327 which, for example, consists of a wheel and the corresponding adjustment elements. In addition, one or more servomotors 337 for automatically adjusting the milling gap setting devices 3314, 3317, 3324, 3327 may be provided.

A possible illustrative example in which the regulation and control device 4 is connected by an interface 42 to the worldwide backbone network, i.e. the Internet and/or an Intranet, is shown, for example, in FIG. 2. The regulation and control device 4 is connected by means of the network interface 42 via a data transmission network 41 and the network interface 202 to the control system of the operating device (plant control system) 20. A web server application 46 provides the desired display and input/output options and/or control/monitoring pages 721/722 for a remote client 7 or browser, wherein the remote client 72 is connected to the network 41 by means of the network interface 71. The regulation and control device 4 also provides the necessary data services or interfaces for data exchange.

This illustrative example may be realised as a mobile application for access to the web server application 46 to the machine control system. The usage may, for example, by restricted to the LAN (Local Area Network), in which the installations 1 are connected. Furthermore, the mobile application can search the network remotely for accessible control systems and select installations 1 with compatible machine control systems. For example, to do this, a User Datagram Protocol (UDP) Broadcast may be used, wherein the machine control system is permanently maintained at a specific address (255.255.255.250) on incoming UDP messages. As soon as a smartphone, for example, sends a corresponding ANLAGEN_PLC_DISCOVERY broadcast using the installed mobile app, all control systems in this network receive this broadcast and answer with the desired properties, such as shown in the following example:

{"ApplicationName":"MDDYZ_2nd_Gen",
  "ApplicationVersion":
    "MDDYZ_2nd_Gen_RC_3.17.1_2019-03-
    22T10_28_48.610Z",
    "FirmwareVersion":"FIRMWARE=03.00.35(b05)",
  "MachineType":"MDDY",
  "MachineNumber": 1235545,
  "MachinePartName1":"Passage 1",
  "MachinePartName2":"Passage 2",
  "NumberOfSides":2,
  "IpAddress":"10.76.243.31",
  "MacAddress":"00:30:de:43:8a:a3"}

The machine control connection may be realised, for example, by means of a software-based engine (see FIG. 5), e.g., even by means of commercial engines such as Phoenix Engine. Phoenix Engine is a software framework consisting of a Wago PLC with embedded linux and a codesys runtime. The web server and an additional one can be integrated. The database forms the central interface between the machine control software and the generic web-based display. The connection between the web server and the machine control software may, for example, be realised by a direct connection by means of websockets. In this illustrative example, the display may be therefore be operated with any conventional browser on a touch display, smartphone, PC. FIG. 5 shows an illustrative example according to the invention with such a mobile application with human-machine interface (HMI) identification for remote operation of machines without local operating panel and remote access by means of the mobile app on the web server for remote machine control by means of the control device 4 (Control Logic). The control device 4 centrally controls the processing devices 31 (machine elements) through a PLC of various passages 3 of the same or different mills 2 and/or processing devices 31 of the same of different milling installations 1 or general installations of the process industry, by them responding to the local PLC 201 of the processing lines 3. The remote control of several milling installations 1 and/or processing lines 3 by means of the central control device 4, particularly milling installations 1 and/or processing lines 3 at geographically comparable sites exhibiting the same or similar collective parameters, for example, environmental parameters such as air pressure, humidity etc., allow collective parameter adaptations, particularly of the control parameters 4311, . . . , 431x transferred to the plant control system 20 or even the PLCs 201, and collective control and collective software updates over any number of processing lines and passages 3. This also allows a new type of interconnectivity to various terminals. The web technology described herein may, in this case, be used as the basis so that an additional degree of independence can be achieved. It is to be added that the collective, i.e. global, parameters may also only relate to device elements in a processing line or passage 3, such as, for example, the control by collective parameters of the adaptation of two rolls of a roll pair in a milling passage 33, such as, for example, in a grist passage 331 or selection passage 332.

If a programmable logic controller (PLC) 201 is used in the control system 20, the operating device 2, e.g., the mill, an optimisation or any company-specific control software for the real-time data exchange with the control system 20, compatible data exchange services are needed. For example, the PLC 201 may be by means of a Control Client (e.g. OPC UA Client) and a corresponding interpreter of the regulation and control device 4 through a corresponding protocol (e.g. OPC UA). In this illustrative example, the web server/data service 46 (e.g. realised as a thin server) provides the connection between the operating device 2 (e.g. realised as a thin client 7) or even process and the Internet. The PLC 201 or a proprietary controller comprises the plant control system 20 by means of which the processing units 31 of the processing line 3 can be controlled and/or regulated. Most PLCs, such as PLCs from AB, Schneider/Modicon or Siemens, for example, support at least one serial connection with corresponding communication protocols of the PLC manufacturer or third-party provider. Typically, the relevant data transfer driver of the thin server 46 manufacturer are provided as embedded software applications. For certain illustrative examples, which need PLCs, optimisations or company-specific software/protocols for the data exchange in real time, a corresponding remote server and compatible data exchange services may be needed. In the illustrative example according to FIG. 2 a web server/data service device (thin server, 46) produces the connection between the device 3 or even process and the Internet. Typically in this case, a connection between the PLCs 201 or a proprietary controller 201 or even the control system 20 is needed to extract data 20 from the control system or even to enable the necessary control of the control system 20 over the network 41. Many PLCs such as, for example, those from Schneider/Modicon or Siemens etc. support at least one serial connection based on communication protocols of the PLC provider or third-party manufacturers. Frequently, a corresponding driver for the communication from the provider of the thin server 46 is available as part of an embedded software application. Using the PLCs 201 standard PLC protocols simplifies the connection of the thin server 46. If a processing unit 31 has a controller that does not have any external communications port, it may be necessary to provide the processing unit 31 with additional sensors and I/O interfaces 32. If the thin server 46 is installed and a corresponding driver is selected, the thin server 46 is configured so that the data of the processing units 31 and the control system 20 have a network link. For example, a gateway server may map the PLC register to network variables or a remote PC connection. Advantageously, the thin server 46 allows a web page to be configured to monitor data of the processing unit 31 or to provide standard data interfaces such as OPC. The Internet or Intranet (LAN) connection to the thin server 46 may comprise, for example, standard Ethernet, dial-up modem lines or wireless connections (for example 802.11b Ethernet). Through the network connection (for example, Internet), a PC browser (desktop PC, laptop, PDA or another thin client 7) access may be obtained to the corresponding web page of the thin server 46. Through this web page, which is provided by the thin server 46, via the browser the regulation and control device 4 and/or the control system 20 or even the control system of the processing units 31 is monitored by the PLCs and their control system is adapted. By means of the device 1 according to the invention it is therefore possible to provide a uniform web-based monitoring of various milling lines through the central regulation and control device 4, by means of which the milling installation 1 is monitored centrally and/or controlled in an optimised way. As an illustrative example, a monitoring or control display 21/45 of the control system 20 of the operating device 2 and/or the regulation and control device 4 may comprise a proximity sensor and/or motion sensor (211/451), wherein the display is switched on and off automatically depending on the measurement results of the proximity sensor and/or motion sensor, based on the measured distance to an operator of the milling installation (1) and/or the mill 2.

The remote control and regulation of the processing devices 31/$B_x$/$C_x$/$S_x$ locally is done by machine processes of the processing devices 31/$B_x$/$C_x$/$S_x$ by means of the regulation and control device 4 in real-time data exchange. In particular, the regulation and control device 4, as described above, may comprise the network interface 42. Through the network interface 42 access can be gained to the control system 20 of the mill 2 with the programmable logic controllers 201/PLC and the network interfaces 202 of the regulation and control device 4. The central regulation and control device 4 may comprise appropriate means and data processing processes 44 for generating the control parameters 4311, . . . , 431x to be transmitted depending on passage-specific 43211, . . . , 4321x and/or passage-encompassing 43221, . . . 4322x batch parameters 432. In so doing, according to the invention, by means of at least one of the control parameters 4311, . . . , 431x based on one or more of the passage-specific and/or environment-specific parameters 432, various milling lines 3 with assigned processing devices 31/$B_x$/$C_x$/$S_x$ are centrally optimised and/or individually controlled by the regulation and control device 4. At least the control parameters 4311, . . . 431x may be optimised and controlled by means of the regulation and control device 4 based on the passage-encompassing parameters 43221, . . . , 4322x globally for at least two different processing lines or passages 3, while the passage-specific parameters 43211, . . . , 4321x act independently on optimisation and control of the control parameters 4311, . . . , 431x of the relevant passage 3. The passage-encompassing parameters 43221, . . . , 4322x location dependent measurement parameters may comprise at least humidity and/or air pressure and/or ambient temperature. The passage-specific parameters 43211, . . . , 4321x may comprise at least local operating parameters of the processing devices 31/$B_x$/$C_x$/$S_x$, such as, for example, energy consumption of the milling roll pairs $B_1, B_2, \ldots, B_x; C_1, C_2, \ldots, C_x$) and/or preliminary pressure and/or input temperature of the milling material. The passage-specific measurement parameters $43211, \ldots, 4321x$ may also comprise at least measurement parameters relating to the flows and/or power consumption of one or more roll stand 31 of the mill installation 1.

For optimisation, the central regulation and control device 4 may comprise operational process recipes 431 wherein, based on an operational process recipe 431 a batch control with a defined processing sequence of the processing units $31/B_x/C_x/S_x$ one of the milling lines 3 is controlled, and wherein, based on the operational process recipe 431 from one or more input materials 5 with specific property parameters 51, a defined quantity of an end product 6 with specific property parameters 61 is produced. The defined property parameters 61 of the end product 61 may comprise at least particle size distribution 611 and/or starch damage 612 and/or protein quality 613 and/or water content 614. During the milling process of an operational process recipe 431, the operational control parameters $4311, \ldots 431x$ and/or the batch parameters 432 are continuously monitored by means of the regulation and control device 4. The monitored, operational control parameters $4311, \ldots, 431x$ and/or the batch parameters 432 may, for example, comprise at least yield 62 and/or energy consumption and/or throughput/machine runtime. If a definable parameter fluctuation or anomaly is detected as defined deviation of the monitored control parameters $4311, \ldots, 431x$ and/or the batch parameters 432 deviate from defined control parameters $4311, \ldots, 431x$ and/or the batch parameters 432, the control parameters $4311, \ldots 431x$ corrected and/or adapted automatically by means of the regulation and control device 4. By means of process-typical operational control parameters $4311, \ldots, 431x$ of an optimised batch process in the standard range, for example, defined quality parameters of the end product 6 and specific flour yield 62 may be determined or predefined depending on the input products 5.

During the milling process of an operational process recipe, the operational control parameters are continuously monitored by means of the regulation and control device, wherein where an anomaly is detected as a defined deviation from the monitored operational process recipe, a warning signal is transmitted, for example, to an alarm unit. The batch parameters may, for example, comprise at least the flows of one or more roll stands of the milling installation. The one or more roll stands may, for example, comprise at least fluted rolls (B passage) and/or smooth rolls (C passage). The batch process parameters may, for example, at least comprise the flows of all roll stands of the milling installation. By means of the process-typical batch process parameters of an optimised batch process in the standard range, for example, defined quality parameters of the end product and specific flour yield may be determined depending on the initial products. The defined quality parameters may, for example, comprise at least particle size distribution and/or starch damage and/or protein quality and/or water content. The monitored batch process parameters may, for example, comprise at least yield and/or energy consumption and/or throughput/machine runtime. During the milling process, for example, in the detection of anomalies, continuous long-term changes in the monitored batch process parameters of the regulation and control device are recorded, wherein the defined deviation from the monitored operational control parameters from the generated operational control parameters of the process recipe is determined depending on the measured continuous long-term changes.

The monitored batch process parameters may, for example, be transmitted by a plurality of control systems 20 according to the invention over the network 41 to the central regulation and control device 4, wherein the plurality of control systems 20 is monitored and controlled centrally. Among other things, the invention has the advantage that it allows, in a technically novel way, the centrally-monitored and controlled identification of long-term or short-term trends in production, automated recognition of abnormalities, automated 24/7 (remote) monitoring and detection of production parameters for (i) yield, (ii) energy and (iii) throughput/machine runtime etc.

REFERENCE LIST

1 Milling installation or general installations of the process industry
2 Operation device (plant), mill
  20 Control system of the operation device (plant control system)
    201 Programmable logic controllers (PLC)
    202 Network interface of the plant control system
    203 Control client (e.g. OPC UA client)
    204 Interpreter
  21 Monitoring or control display of the operation device 2
    211 Proximity sensor and/or motion sensors
3 Processing line/passage
  31 Processing units
    $B_1, B_2, \ldots, B_x$ fluted rolls
    $C_1, C_2, \ldots, C_x$ smooth rolls
    $S_1, S_2, \ldots, S_x$ sifting/screening devices
  32 I/O interface; interlocked elements
  33 Illustrative example of a roll stand with an eight roll passage
    331 Grist passage
      3311/3312 Fluted rolls of the grist passage
      3313 Stripper brush
      3314 Setting device for setting the mill gap
      3315/3316 Lower roll pair of the grist passage
      3317 Setting device for setting the mill gap
    332 Comminution passage
      3321/3322 Smooth rolls of the comminution passage
      3323 Stripping knife
      3324 Setting device for setting the milling gap
      3325/3326 Lower roll pair of the comminution passage
      3327 Setting device for setting the milling gap
    333 Infeed cylinder
    334 Feed channel
    335 Air channels
    336 Product removal funnel
    337 Servomotor
4 Regulation and control device
  41 Data transmission network
  42 Network interface of the regulation and control device
  43 Parameters
    431 Operational process recipe
      $4311, \ldots 431x$ Control parameters
    432 Batch parameters
      $43211, \ldots, 4321x$ passage-specific parameters
      $43221, \ldots, 4322x$ passage-encompassing parameters
  44 Means of generating the control parameters $4311, \ldots, 431x$ 45 Monitoring of control display of the regulation and control device 4
  451 Proximity sensor and/or motion sensors
46 Network data service/web server/thin server
47 Machine/process control
5 Input products
  51 Measurement parameters of the input material
6 End products
  61 Measurement parameters of the end product
    611 Particle size distribution
    612 Starch damage
    613 Protein quality
    614 Water content
  62 Specific yield
7 Web-based control client/thin client
  71 Network interface
  72 Browser interface
    721 Controlling/steering of the operating device/milling installation
    722 Monitoring of the operating device/milling installation

The invention claimed is:

1. A milling installation comprising:
one or more mills with one or more processing lines for industrial production of a plurality of milling products, wherein each of the one or more processing lines comprises processing devices including at least one milling passage with milling roll pairs for milling a milling material and at least one downstream screening passage for sifting or screening the milling material, each of the at least one milling passage comprising an upper milling roll and a lower milling roll underneath the upper milling roll with a product removal funnel between the upper milling roll and the lower milling roll, wherein the one or more processing lines are configured to produce a specific milling product with specific yield parameters and milled product parameter, and wherein each of the one or more mills of the milling installation comprises at least one programmable logic controller circuitry configured for local control and/or regulation of the processing devices assigned to each of the one or more processing lines through allocated I/O interfaces; and
a central regulation and control circuitry for optimized control of the milling installation, wherein the programmable logic controller circuitries are connected bidirectionally by network interfaces to the central regulation and control circuitry and are configured to respond to transferred control parameters from the central regulation and control circuitry, and wherein the processing devices of each of the one or more processing lines are configured to be actuated based on the control parameters under control of the programmable logic controller circuitries remotely through assigned I/O interfaces and operation of which is controllable locally, wherein
the central regulation and control circuitry is configured to generate the control parameters depending on passage-specific and/or passage-encompassing batch parameters, wherein the passage-encompassing batch parameters comprise parameters with a same or corresponding relevance on the processing lines, and are configured to be used centrally through the central regulation and control circuitry to generate control/regulation and monitoring of the processing lines, and wherein the passage-specific batch parameters comprise parameters with only specific relevance for a certain one of the one or more processing lines or are specific for one of the processing devices,
the central regulation and control circuitry is further configured to automatically detect and correct a definable parameter fluctuation or anomaly of at least one of the control parameters or the batch parameters, and
the processing devices being configured to be centrally optimizable by one of the control parameters based on one or more of the passage-specific and/or passage-encompassing parameters of various ones of the one or more processing lines by the regulation and control circuitry, wherein by the regulation and control circuitry, the passage-encompassing parameters are globally optimizable and controllable across the devices for at least two of the processing lines, whereas by the regulation and control circuitry, the passage-specific parameters are optimizable and controllable independently in relation to a relevant one of the one or more processing lines.

2. The milling installation according to claim 1, wherein remote control and regulation of the processing devices is done by local machine processes of the processing devices by the central regulation and control circuitry in real-time data exchange.

3. The milling installation according to claim 1, wherein the central regulation and control circuitry comprises a network interface by which a control system of the one or more mills, comprising the programmable logic controller circuitries and the network interfaces of the central regulation and control circuitry is accessible, and the central regulation and control circuitry is configured to generate the control parameters to be passed depending on the passage-specific and passage-encompassing batch parameters, wherein, by at least one of the control parameters based on one or more of the passage-specific and/or environment-specific parameters various ones of the processing lines are centrally optimizable and/or individually controllable by the regulation and control circuitry.

4. The milling installation according to claim 3, wherein the passage-encompassing parameters comprise location-dependent measurement parameters comprising humidity and/or air pressure and/or ambient temperature, and the passage-specific parameters comprise local operating parameters of the processing devices comprising energy consumption of the milling roll pairs and/or preliminary pressure and/or input temperature of the milling material.

5. The milling installation according to claim 3, wherein by the central regulation and control circuitry, the passage-encompassing parameters are optimized and controlled globally for at least two milling passages, whereas the passage-specific parameters are optimized and controlled independently in relation to a relevant one of the milling passages.

6. The milling installation according to claim 3, wherein the control parameters, based on the passage-encompassing parameters, are optimized and controlled globally for at least two different ones of the processing lines, whereas the passage-specific parameters are optimized and controlled independently to effect an optimized generation of the control parameters of a relevant one of the passages.

7. The milling installation according to claim 1, wherein the central regulation and control circuitry is configured to implement operative process recipes, wherein, based on one of the operative process recipes, a batch control is controllable with a defined processing sequence of the milling roll pairs or the at least one downstream screening passage of one of the processing lines, and wherein, based on the one of the operative process recipes, from one or more input materials with specific property parameters, a defined quantity of an end product with specific property parameters can be generated,
wherein during a milling process of the one of the operational process recipes, the central regulation and control circuitry is configured to monitor continuously the operational control parameters and/or the batch parameters, wherein in a detection of a definable parameter value fluctuation or anomaly as defined by a deviation of the monitored control parameters and/or the batch parameters from defined control parameters and/or the batch parameters, the control parameters are corrected and/or adapted automatically by the central regulation and control circuitry.

8. The milling installation according to claim 1, wherein the passage-specific measurement parameters comprise at least measurement parameters relating to flows and/or power consumption of one or more roll stands of the milling installation.

9. The milling installation according to claim 8, wherein the milling roll pairs comprise at least fluted rolls and/or smooth rolls.

10. The milling installation according to claim 8, wherein the passage-specific measurement parameters comprise at least measurement parameters relating to the flows and/or power consumption of all roll stands of the mill.

11. The milling installation according to claim 1, wherein by process-typical operation control parameters of an optimized batch process in a standard range, defined quality parameters of an end product and specific flour yield are determined depending on input products.

12. The milling installation according to claim 1, wherein defined property parameters of an end product comprise at least particle size distribution and/or starch damage and/or protein quality and/or water content.

13. The milling installation according to claim 7, wherein the monitored, operational control parameters and/or the batch parameters comprise at least yield and/or energy consumption and/or throughput/machine runtime.

14. The milling installation according to claim 1, wherein the central regulation and control circuitry is configured to implement a single, displayable web-based monitoring system of various ones of the processing lines, such that the milling installation can be monitored and/or is optimizably controllable.

15. The milling installation according to claim 1, further comprising a proximity sensor and/or motion sensor, wherein a display is automatically switched on and off depending on the measurement results of the proximity sensor and/or motion sensor of the milling installation, based on a measured distance to an operator of the milling installation and/or the mill.

16. A process for optimized control of a milling installation, comprising
providing the milling installation comprising one or more mills with one or more processing lines for industrial manufacture of a variety of milling products, wherein in each of the one or more processing lines, by at least one milling passage with milling roll pairs, a milling product is milled and is screened and/or sifted by at least one downstream screening passage, each of the at least one milling passage comprising an upper milling roll and a lower milling roll underneath the upper milling roll with a product removal funnel between the upper milling roll and the lower milling roll, wherein a specific milling product with specific yield parameters and milling parameters is produced, and wherein each of the one or more mills of the milling installation comprises a programmable logic controller circuitry for local control and/or regulation of the milling roll pairs or the at least one downstream screening passage assigned to the one or more processing lines over assigned I/O interfaces, wherein the milling installation comprises a central regulation and control circuitry configured for optimized control of the milling installation, wherein the programmable logic controller circuitries are connected bidirectionally by network interfaces with the central regulation and control circuitry and are configured to respond to transferred control parameters from the central regulation and control circuitry:

actuating the milling roll pairs or the at least one downstream screening passage of one of the processing lines based on the control parameters by the programmable logic controller circuitries remotely through the assigned I/O interfaces and operation of which is controllable locally;

generating, using the central regulation and control circuitry, control parameters to be transferred depending on passage-specific and/or passage-encompassing batch parameters, wherein the passage-encompassing parameters comprise parameters with a same or corresponding relevance on various ones of the one or more processing lines and are used centrally through the central regulation and control circuitry to generate control/regulation and monitoring of several of the one or more processing lines, and wherein the passage-specific parameters comprise parameters with only specific relevance for a certain one of the one or more processing lines or are specific for one of the milling roll pairs or the at least one downstream screening passage;

automatically detecting and correcting, using the central regulation and control circuitry, a definable parameter fluctuation or anomaly of at least one of the control parameters or the batch parameters; and centrally optimizing, by the regulation and control circuitry, the milling roll pairs or the at least one downstream screening passage by one of the control parameters based on one or more of the passage-specific and/or passage-encompassing parameters of various ones of the one or more processing lines, wherein by the central regulation and control circuitry, the passage-encompassing parameters are globally optimized and controlled across the devices for at least two of the processing lines, whereas by the central regulation and control circuitry, the passage-specific parameters are optimized and controlled independently in relation to the relevant one of the processing lines.

* * * * *